United States Patent
Inoue

(10) Patent No.: US 12,216,230 B2
(45) Date of Patent: Feb. 4, 2025

(54) SENSOR SYSTEM

(71) Applicant: KOITO MANUFACTURING CO., LTD., Tokyo (JP)

(72) Inventor: Hiroshi Inoue, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 926 days.

(21) Appl. No.: 17/296,800

(22) PCT Filed: Nov. 22, 2019

(86) PCT No.: PCT/JP2019/045786
§ 371 (c)(1),
(2) Date: May 25, 2021

(87) PCT Pub. No.: WO2020/110936
PCT Pub. Date: Jun. 4, 2020

(65) Prior Publication Data
US 2022/0026533 A1    Jan. 27, 2022

(30) Foreign Application Priority Data

Nov. 27, 2018    (JP) .................................. 2018-220991

(51) Int. Cl.
*G01S 7/481*    (2006.01)
*G01S 17/931*    (2020.01)

(52) U.S. Cl.
CPC ........... *G01S 7/4811* (2013.01); *G01S 17/931* (2020.01)

(58) Field of Classification Search
CPC ................. G01S 7/4811; G01S 17/931; G01S 2013/9323; G01S 1/87; G01S 2013/93271; G01S 2013/93272; G01S 2013/93275; G01S 2013/93277; G01S 13/931; G06V 20/56
USPC ...................................................... 356/4.01
See application file for complete search history.

(56) References Cited

U.S. PATENT DOCUMENTS

| | | |
|---|---|---|
| 2001/0024171 A1 | 9/2001 | Nishimura |
| 2008/0158897 A1 | 7/2008 | Nakamura et al. |
| 2017/0282798 A1 | 10/2017 | Saito et al. |
| 2018/0088230 A1 | 3/2018 | Hung et al. |
| 2020/0300964 A1 | 9/2020 | Kasaba et al. |

FOREIGN PATENT DOCUMENTS

| | | |
|---|---|---|
| EP | 1130416 A2 | 9/2001 |
| EP | 3514444 A1 | 7/2019 |
| JP | 5-173634 A | 7/1993 |
| JP | 6-282799 A | 10/1994 |
| JP | 2003-307561 A | 10/2003 |

(Continued)

OTHER PUBLICATIONS

Search Report (PCT/ISA/210) issued Jan. 21, 2020 by the International Searching Authority in International Application No. PCT/JP2019/045786.

(Continued)

*Primary Examiner* — Daniel L Murphy
(74) *Attorney, Agent, or Firm* — Sughrue Mion, PLLC

(57) ABSTRACT

A sensor unit is disposed outside a lamp housing of a vehicle to detect information in an outside area of the vehicle. An actuator is configured to be able to change at least one of a position and a posture of the sensor unit with respect to the lamp housing. A processor is configured to control an operation of the actuator.

14 Claims, 18 Drawing Sheets

(56) References Cited

FOREIGN PATENT DOCUMENTS

| JP | 2007-106199 A | 4/2007 |
|---|---|---|
| JP | 2017-182589 A | 10/2017 |
| WO | 2018/051909 A1 | 3/2018 |

OTHER PUBLICATIONS

Written Opinion (PCT/ISA/237) issued Jan. 21, 2020 by the International Searching Authority in International Application No. PCT/JP2019/045786.
Office Action dated Sep. 7, 2023, issued by Chinese Patent Office in Chinese Patent Application No. 201980078327.1.
Communication issued Dec. 14, 2021 by the European Patent Office in European Patent Application No. 19891437.6.

SENSOR SYSTEM

CROSS-REFERENCE TO RELATED APPLICATIONS

This application is a National Stage of International Application No. PCT/JP2019/045786 filed on Nov. 22, 2019, claiming priority based on Japanese Patent Application No. 2018-220991, filed on Nov. 27, 2018.

FIELD

The presently disclosed subject matter relates to a sensor system adapted to be installed in a vehicle.

BACKGROUND

In order to perform driving support of a vehicle, a sensor unit for detecting information in an outside area of the vehicle is mounted on a body of the vehicle. Patent Document 1 discloses a radar as such a sensor unit. In order to expand an area where such information is detectable, a plurality of radars are mounted on the vehicle. The radars are fixed to a lamp chamber of a lamp device for lighting the outside area of the vehicle, an inner side of a front bumper, a door mirror, or the like.

As used herein, the term "driving support" means control processing that at least partially performs at least one of driving operation (steering operation, acceleration, deceleration, etc.), monitoring of a driving environment, and backup of driving operation. That is, the term "driving support" means not only the partial driving support such as braking function for collision avoidance and assisting function for lane-keeping, but also a full self-driving operation.

CITATION LIST

Patent Document

Patent Document 1: Japanese Patent Publication No. 2007-106199A

SUMMARY

Technical Problem

It is demanded to enhance the information detecting capability of a sensor system installed in a vehicle.

Solution to Problem

In order to meet the demand described above, an illustrative aspect of the presently disclosed subject matter provides a sensor system adapted to be installed in a vehicle, comprising:
- a sensor unit adapted to be disposed outside a lamp housing of the vehicle to detect information in an outside area of the vehicle;
- an actuator configured to be able to change at least one of a position and a posture of the sensor unit with respect to the lamp housing; and
- a processor configured to control an operation of the actuator.

According to such a configuration, since the sensor unit is disposed outside the lamp housing, it is possible to alleviate the constraint on the change in at least one of the posture and the position of the sensor unit caused by the shape of the lamp housing itself or the layout of the lamp unit housed in the lamp housing. In other words, the degree of freedom for changing at least one of the posture and the position of the sensor unit is increased, so that it is facilitated to move the area capable of detecting information in the outside area of the vehicle to a desired location. Accordingly, it is possible to enhance the information detecting capability of the sensor system installed in the vehicle.

The above sensor system may be configured such that the actuator translates the sensor unit to change the position thereof.

According to such a configuration, it is possible to realize a change in the position of the sensor unit with respect to the lamp housing with an actuator having a relatively simple configuration. In addition, by appropriately combining the posture change and the translation of the sensor unit, it is possible to cause the sensor unit to take a posture that cannot be assumed in the initial state. Accordingly, the range and the degree of freedom in connection with the location change of the area capable of detecting information in the outside area of the vehicle can be further increased.

The above sensor system may be configured such that:
- the lamp housing includes a left lamp housing and a right lamp housing; and
- the sensor unit includes: a first sensor unit adapted to be disposed on the right of the left lamp housing; and a second sensor unit adapted to be disposed on the left of the right lamp housing.

Alternatively, the above sensor system may be configured such that:
- the lamp housing includes a left lamp housing and a right lamp housing; and
- the sensor unit includes: a first sensor unit adapted to be disposed on the left of the left lamp housing; and a second sensor unit adapted to be disposed on the right of the right lamp housing.

Alternatively, the above sensor system may be configured such that the sensor unit includes: a first sensor unit adapted to be disposed on the left of the lamp housing; and a second sensor unit adapted to be disposed on the right of the lamp housing.

The above sensor system may be configured such that the processor is configured to control the operation of the actuator so as to expand an area capable of detecting the information with any one of the first sensor unit and the second sensor unit.

The above sensor system may be configured such that the processor is configured to control the operation of the actuator so as to change at least one of a location and a size of an area capable of detecting the information with both of the first sensor unit and the second sensor unit.

As used herein, the term "sensor unit" means a constituent unit of a component that can be distributed by itself as a single unit while providing a desired information detecting function.

DESCRIPTION OF EMBODIMENTS

Examples of embodiments will be described below in detail with reference to the accompanying drawings. In each of the drawings used in the following description, the scale is appropriately changed in order to make each member have a recognizable size.

In the accompanying drawings, an arrow F represents a forward direction of the illustrated structure. An arrow B represents a rearward direction of the illustrated structure. An arrow U represents an upward direction of the illustrated structure. An arrow D represents a downward direction of the illustrated structure. An arrow L represents a leftward direction of the illustrated structure. An arrow R represents a rightward direction of the illustrated structure. The terms "left" and "right" used in the following descriptions represent the left-right directions when viewed from the driver's seat.

Figure 1:
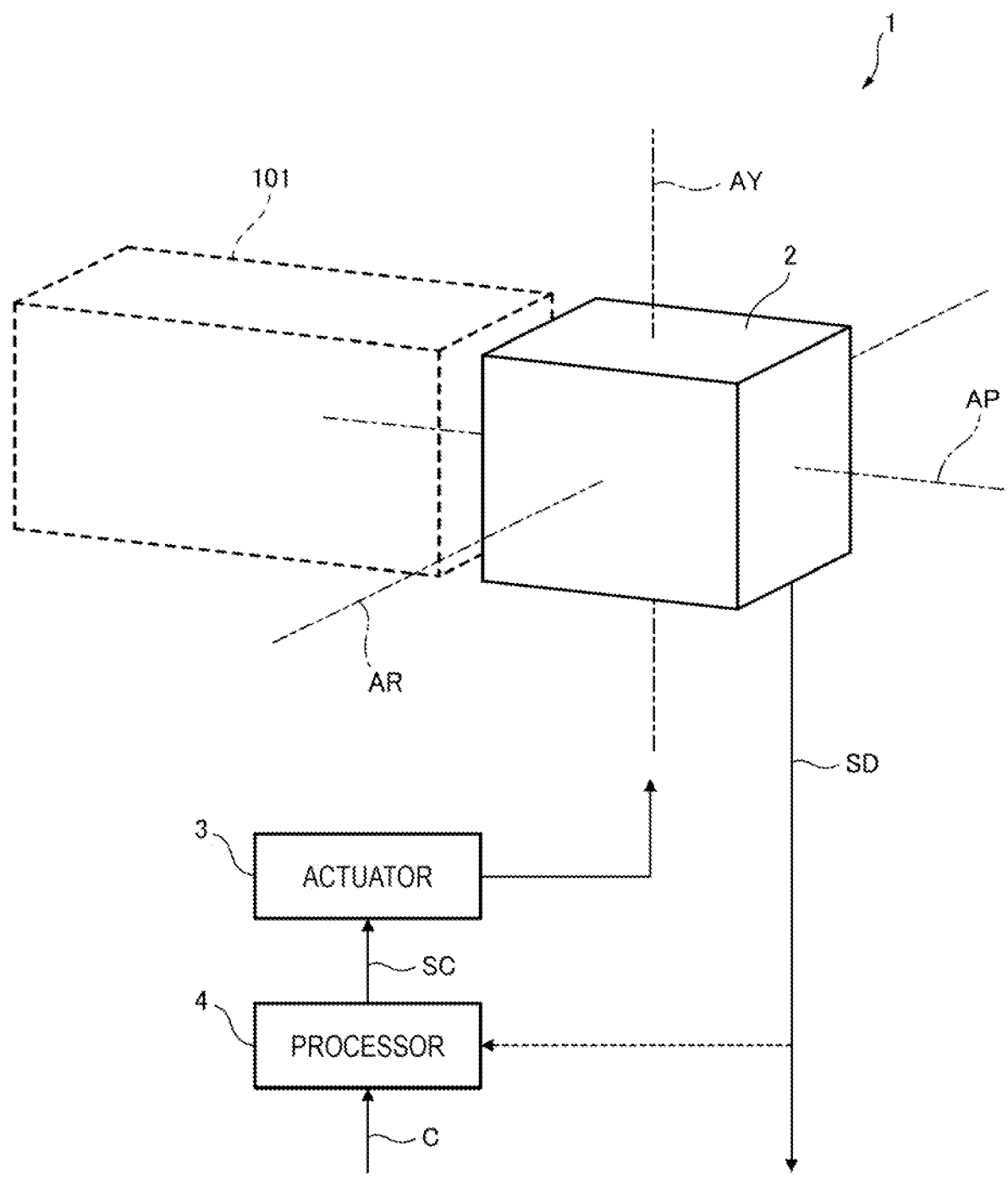
FIG. 1 illustrates a configuration of a sensor system according to an embodiment.

FIG. 1 schematically illustrates a configuration of a sensor system 1 according to an embodiment. The sensor system 1 is adapted to be installed in a vehicle 100 illustrated in FIG. 2.

The sensor system 1 includes a sensor unit 2. The sensor unit 2 is a device for acquiring information in an outside area of the vehicle. The sensor unit 2 is configured to output a detection signal SD corresponding to the detected information.

The sensor unit 2 may be, for example, a LiDAR (Light Detection and Ranging) sensor unit. The LiDAR sensor unit has a configuration for emitting sensing light toward a sensing area outside the vehicle 100, and a configuration for detecting returned light (not illustrated) as a result of the sensing light being reflected by an object existing in the sensing area. As the sensing light, for example, infrared light having a wavelength of 905 nm can be used. The LiDAR sensor unit may include a scanning mechanism (not illustrated) that changes a direction that the sensing light is emitted. As a result, the sensing area defined outside the vehicle 100 can be scanned by the sensing light.

The LiDAR sensor unit can obtain the distance to the object associated with the returned light, for example, based on the time period from the time when the sensing light is emitted in a certain direction to the time when the returned light is detected. In addition, by accumulating such distance data in association with the sensing position, it is possible to obtain information as to the shape of the object associated with the returned light. Additionally or alternatively, information as to an attribute such as the material of the object associated with the returned light can be acquired based on the difference in waveforms of the emitted light and the returned light.

The sensor unit 2 may be, for example, a camera unit. The camera unit includes an image pickup device that acquires an image of an outside area of the vehicle 100. The wavelength of the light for which the image pickup element has sensitivity may be in a visible light range or an infrared light range. The camera unit may be a TOF (Time of Flight) camera unit that also acquires information as for a distance to an object for each pixel.

The sensor unit 2 may be, for example, a millimeter wave radar unit. The millimeter wave radar unit has a configuration for transmitting a millimeter wave and a configuration for receiving a reflection wave resulting from the millimeter wave being reflected by an object existing outside the vehicle 100. Examples of frequencies of millimeter waves include 24 GHz, 26 GHz, 76 GHz, and 79 GHz. The millimeter wave radar unit can obtain the distance to the object associated with the reflected wave, for example, based on the time period from the time when the millimeter wave is transmitted in a certain direction to the time when the reflected wave is received. In addition, by accumulating such distance data in association with the detecting position, it is possible to acquire information as to the shape of the object associated with the reflection wave.

Figure 2:
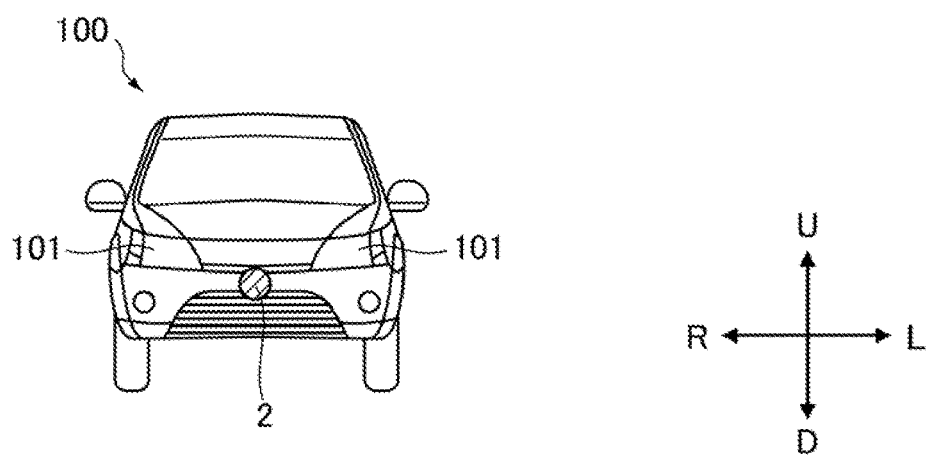
FIG. 2 illustrates an exemplary arrangement of a sensor unit of FIG. 1.
Figure 2:
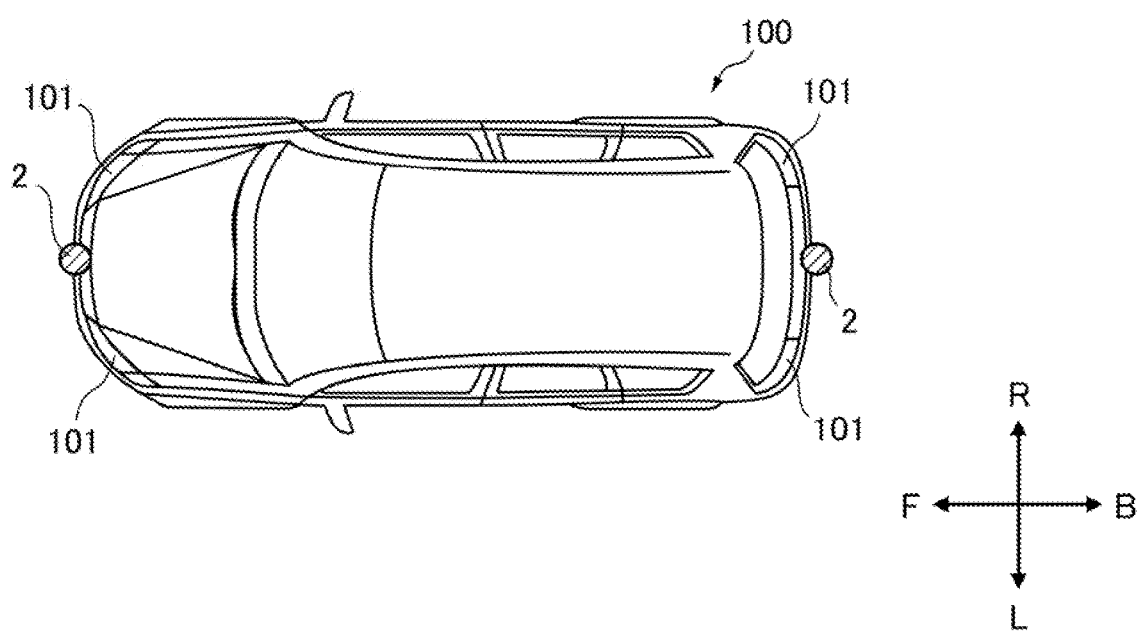
Figure 2:
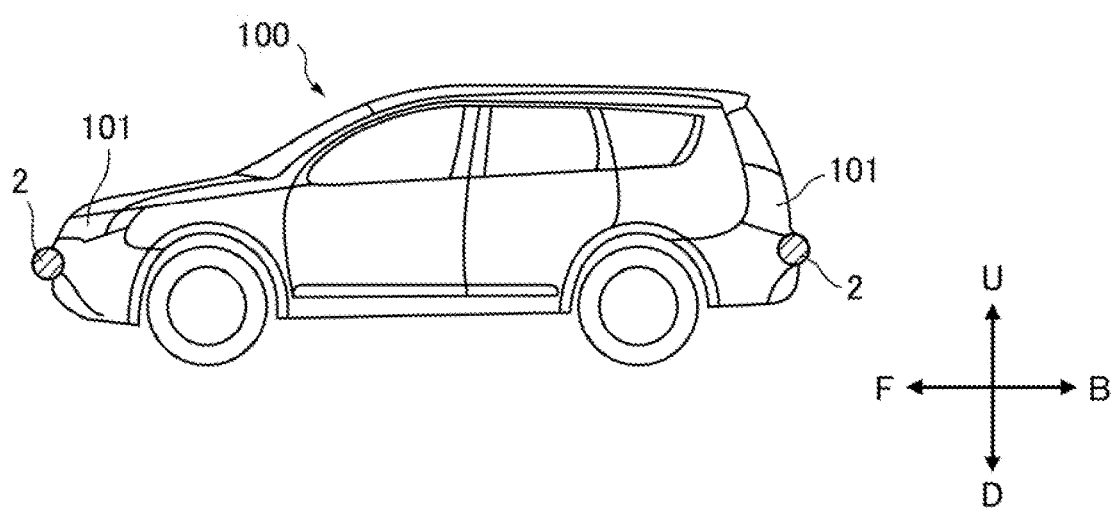

As illustrated in FIG. 2, the vehicle 100 includes a plurality of lamp housings 101. Each lamp housing 101 houses a lamp unit. The lamp unit is a device for emitting visible light to the outside of the vehicle 100. Examples of the lamp unit include a headlamp, a direction indicator lamp, a marker lamp, a tail lamp, a brake lamp, and a fog lamp.

The sensor unit 2 is disposed outside the lamp housings 101. In the example illustrated in FIG. 2, the sensor unit 2 is disposed at a front end portion of the vehicle 100 in a center area in the left-right direction of the vehicle 100.

As illustrated in FIG. 1, the sensor system 1 includes an actuator 3. The actuator 3 is configured to change a posture of the sensor unit 2 with respect to the lamp housing 101.

Specifically, at least one of a pitch axis AP, a yaw axis AY, and a roll axis AR can be defined for the sensor unit 2. The actuator 3 may include at least one of a mechanism for taming the sensor unit 2 about the yaw axis AY, a mechanism for turning the sensor unit 2 about the pitch axis AP, and a mechanism for turning the sensor unit 2 about the roll axis AR. Since a well-known configuration can be applied to each mechanism, detailed descriptions thereof will be omitted.

The sensor system 1 includes a processor 4. The processor 4 may be disposed at an appropriate position in the vehicle 100. The processor 4 may be provided as a general-purpose microprocessor operating in conjunction with a general-purpose memory, or may be provided as part of a dedicated integrated circuit device. Examples of the general-purpose microprocessor include a CPU, an MPU, and a GPU. Examples of the general-purpose memory include a RAM and a ROM. The general-purpose microprocessor may be a part of another control device (ECU or the like) installed in the vehicle 100. Examples of the dedicated integrated circuit element include a microcontroller, an ASIC, and an FPGA.

The processor 4 is configured to be able to output a control signal SC for controlling the operation of the actuator 3. The control signal SC may be outputted based on a command C from another control device, or may be outputted based on a determination performed by the processor 4 itself. In such a determination, the detection signal SD from the sensor unit 2 may be used. Depending on the specification of the actuator 3, an appropriate signal conversion circuit may be provided between the processor 4 and the actuator 3.

Figure 3A:
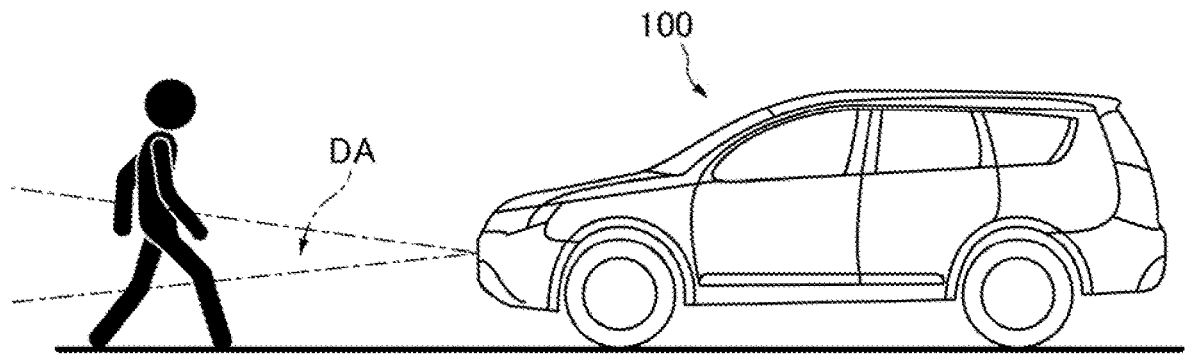
FIG. 3A illustrates an exemplary operation of the sensor unit of FIG. 2.
Figure 3A:
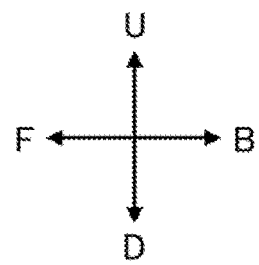

An example of the operation of the sensor system 1 configured as described above will be mentioned with reference to FIGS. 3A and 3B. FIG. 3A illustrates an initial state of the sensor unit 2. The sensor unit 2 can detect information in a sensing area DA ahead of the vehicle 100. In the illustrated example, a person walking ahead of the vehicle 100 is located in the sensing area DA.

Figure 3B:
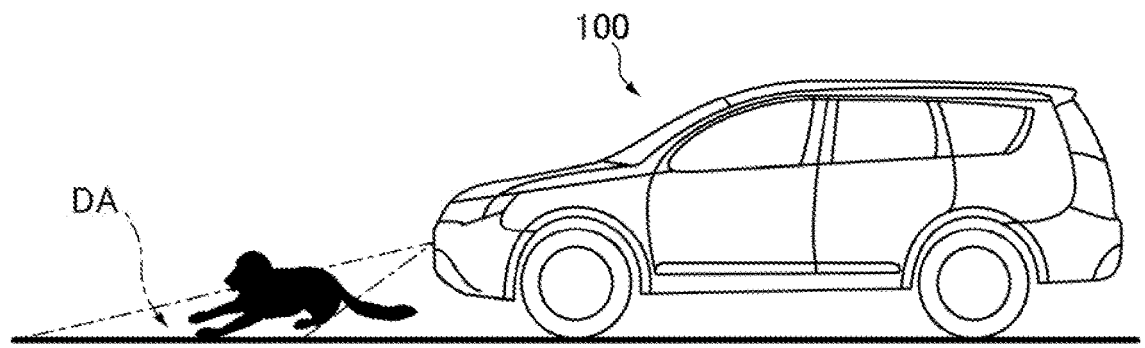
FIG. 3B illustrates an exemplary operation of the sensor unit of FIG. 2.
Figure 3B:
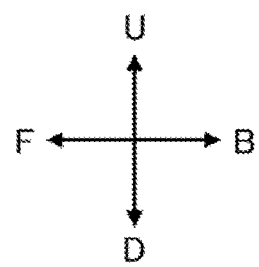

FIG. 3B illustrates a state that the sensor unit 2 is turned in the counterclockwise direction in the drawing about the pitch axis AP. That is, the posture of the sensor unit 2 with respect to the lamp housing 101 is changed. The changing operation is realized by the actuator 3 having a mechanism for turning the sensor unit 2 about the pitch axis AP based on the control signal SC from the processor 4.

In the example illustrated in FIG. 3B, a dog lying down ahead of the vehicle 100 is located in the sensing area DA. The position of the dog corresponds to a blind spot of the sensing area DA in the initial state illustrated in FIG. 3A. That is, by changing the posture of the sensor unit 2 by the actuator 3, the location of the sensing area DA changes, so that the dog located in the blind spot in the initial state can be detected.

As described above, the sensor unit 2 is disposed outside the lamp housing 101. Accordingly, it is possible to alleviate the constraint on the change in the posture of the sensor unit 2 caused by the shape of the lamp housing 101 itself or the layout of the lamp unit housed in the lamp housing 101. In other words, the degree of freedom for changing the posture of the sensor unit 2 is increased, so that it is facilitated to move the sensing area DA to a desired location. Accordingly, it is possible to enhance the information detecting capability of the sensor system 1 installed in the vehicle 100.

Additionally or alternatively, the actuator 3 may change the position of the sensor unit 2 with respect to the lamp housing 101. For example, the actuator 3 may include at least one of a mechanism for translating the sensor unit 2 along the pitch axis AP, a mechanism for translating the sensor unit 2 along the yaw axis AY, and a mechanism for translating the sensor unit 2 along the roll axis AR. Since a well-known configuration can be applied to each mechanism, detailed descriptions thereof will be omitted.

Figure 4:
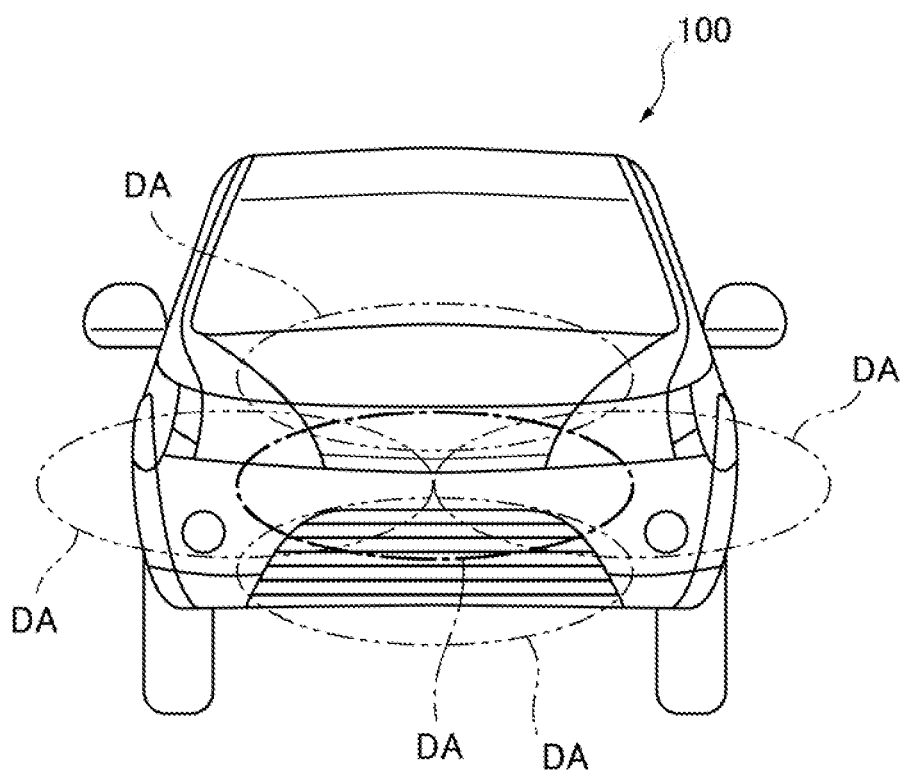
FIG. 4 illustrates another exemplary operation of the sensor unit of FIG. 2.
Figure 4:
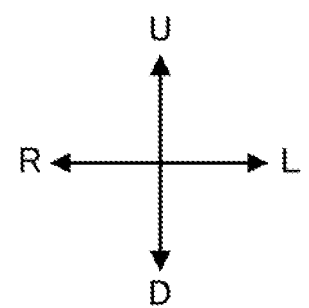

FIG. 4 illustrates an example of the operation of the sensor system 1 configured as described above. In the initial state, the sensing area DA of the sensor unit 2 is located at a position indicated by a chain line. When the actuator 3 translates the sensor unit 2 along the pitch axis AP based on the control signal SC from the processor 4, the sensing area DA translates in the left-right direction of the vehicle 100. When the actuator 3 translates the sensor unit 2 along the yaw axis AY based on the control signal SC from the processor 4, the sensing area DA translates in the up-down direction of the vehicle 100.

Since the sensor unit 2 is disposed outside the lamp housing 101, it is possible to alleviate the constraint on the change in the position of the sensor unit 2 caused by the shape of the lamp housing 101 itself or the layout of the lamp unit housed in the lamp housing 101. In other words, the degree of freedom for changing the position of the sensor unit 2 is increased, so that it is facilitated to move the sensing area DA to a desired location. Accordingly, it is possible to enhance the information detecting capability of the sensor system 1 installed in the vehicle 100.

In particular, since the change of the position of the sensor unit 2 with respect to the lamp housing 101 involves the translation, the change of the position can be realized by an actuator having a relatively simple configuration.

As illustrated in FIG. 2, the sensor unit 2 may also be disposed at a rear end portion of the vehicle 100 in a center area in the left-right direction of the vehicle 100. The actuator 3 and the processor 4 may be disposed at appropriate positions corresponding to the positions of the sensor unit 2. The processor 4 may be provided as a device independent of the processor 4 associated with the sensor unit 2 disposed at the front end portion of the vehicle 100, or may share functions with the processor 4 associated with the sensor unit 2 disposed at the front end portion of the vehicle 100.

Figure 5A:
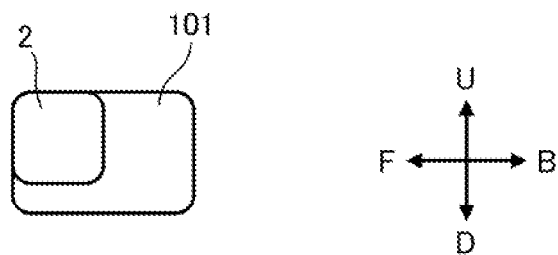
FIG. 5A illustrates another exemplary operation of the sensor unit of FIG. 1.
Figure 5B:
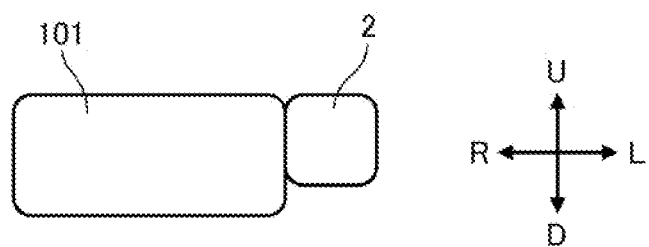
FIG. 5B illustrates another exemplary operation of the sensor unit of FIG. 1.
Figure 5C:
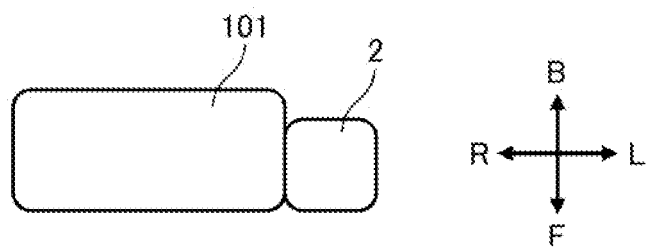
FIG. 5C illustrates another exemplary operation of the sensor unit of FIG. 1.
Figure 5D:
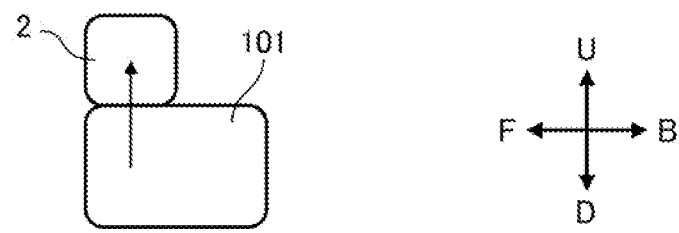
FIG. 5D illustrates another exemplary operation of the sensor unit of FIG. 1.
Figure 5E:
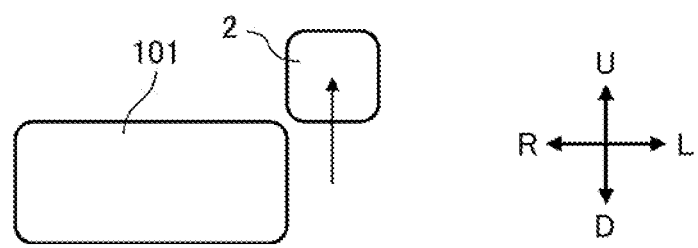
FIG. 5E illustrates another exemplary operation of the sensor unit of FIG. 1.
Figure 5F:
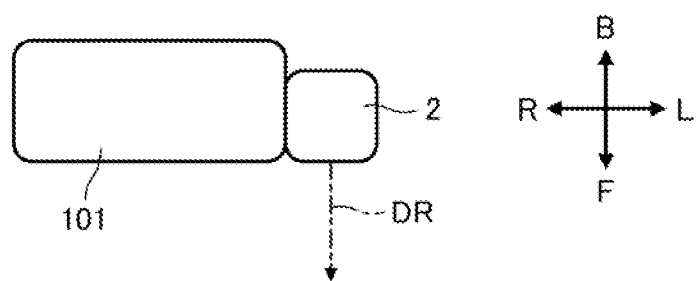
FIG. 5F illustrates another exemplary operation of the sensor unit of FIG. 1.

FIGS. 5A to 5C schematically illustrate an initial positional relationship between the sensor unit 2 and the lamp housing 101 disposed in a front portion of the vehicle 100. FIGS. 5D to 5F illustrate a state that the sensor unit 2 is translated upward along the yaw axis AY. An arrow DR represents a sensing reference direction of the sensor unit 2.

Figure 5G:
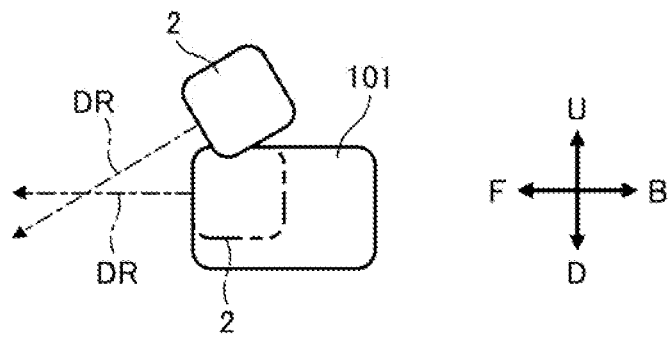
FIG. 5G illustrates another exemplary operation of the sensor unit of FIG. 1.
Figure 5H:
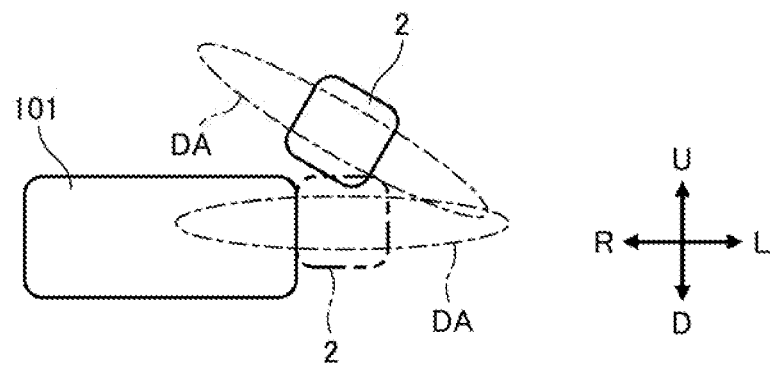
FIG. 5H illustrates another exemplary operation of the sensor unit of FIG. 1.
Figure 5I:
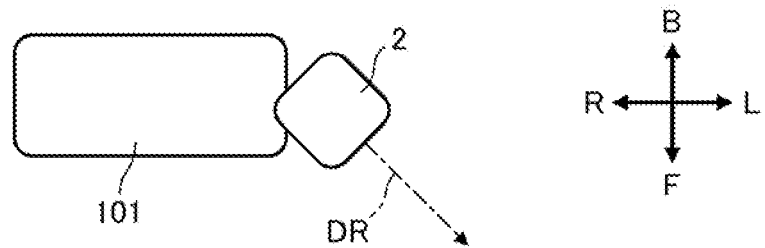
FIG. 5I illustrates another exemplary operation of the sensor unit of FIG. 1.

FIG. 5G illustrates an example that the posture of the sensor unit 2 is changed about the pitch axis AP from the state illustrated in FIG. 5D. FIG. 5H illustrates an example that the posture of the sensor unit 2 is changed about the roll axis AR from the state illustrated in FIG. 5E. FIG. 5I illustrates an example that the posture of the sensor unit 2 is changed about the yaw axis AY from the state illustrated in FIG. 5F.

Figure 6A:
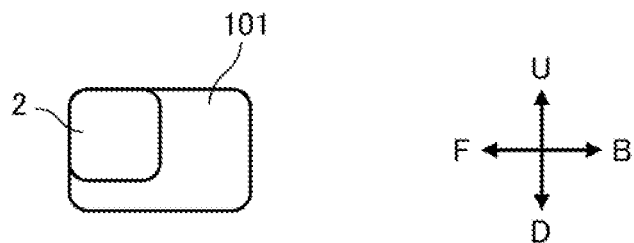
FIG. 6A illustrates another exemplary operation of the sensor unit of FIG. 1.
Figure 6B:
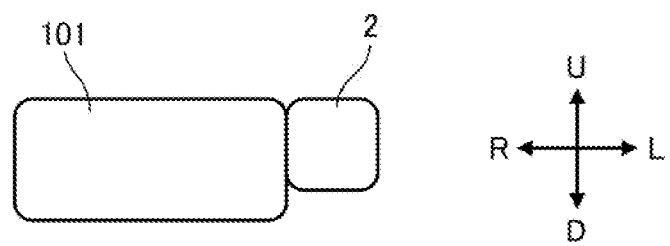
FIG. 6B illustrates another exemplary operation of the sensor unit of FIG. 1.
Figure 6C:
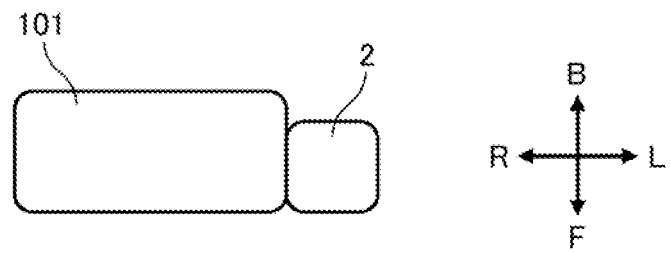
FIG. 6C illustrates another exemplary operation of the sensor unit of FIG. 1.
Figure 6D:
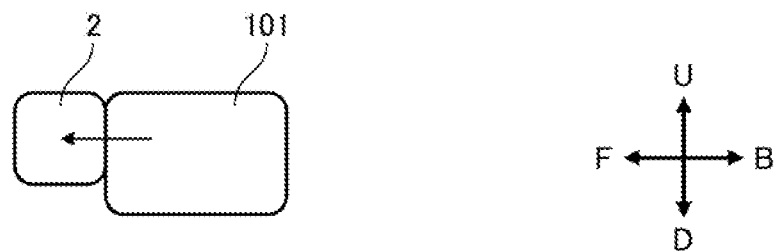
FIG. 6D illustrates another exemplary operation of the sensor unit of FIG. 1.
Figure 6E:
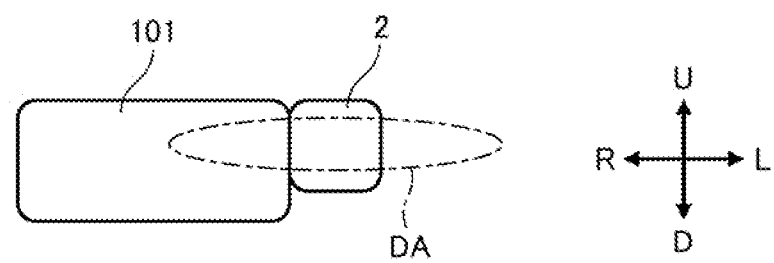
FIG. 6E illustrates another exemplary operation of the sensor unit of FIG. 1.
Figure 6F:
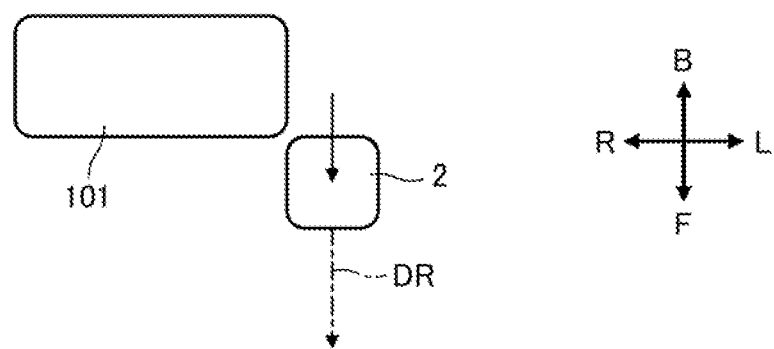
FIG. 6F illustrates another exemplary operation of the sensor unit of FIG. 1.

FIGS. 6A to 6C schematically illustrate an initial positional relationship between the sensor unit 2 and the lamp housing 101 disposed in the front portion of the vehicle 100. FIGS. 6D to 6F illustrate a state that the sensor unit 2 is translated forward along the roll axis AR.

Figure 6G:
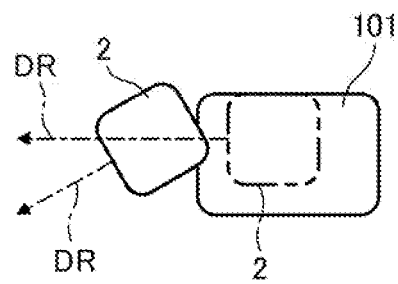
FIG. 6G illustrates another exemplary operation of the sensor unit of FIG. 1.
Figure 6G:
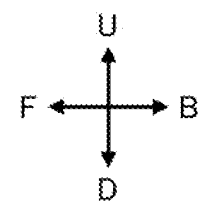
Figure 6H:
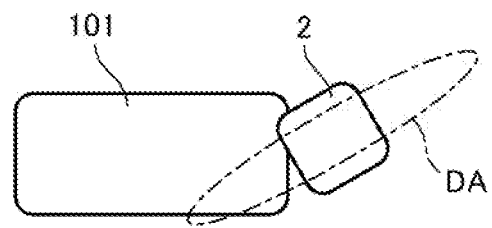
FIG. 6H illustrates another exemplary operation of the sensor unit of FIG. 1.
Figure 6H:
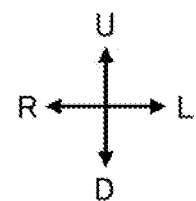
Figure 6I:
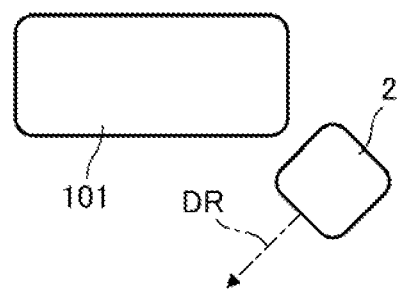
FIG. 6I illustrates another exemplary operation of the sensor unit of FIG. 1.
Figure 6I:
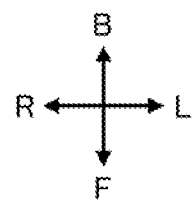

FIG. 6G illustrates an example that the posture of the sensor unit 2 is changed about the pitch axis AP from the state illustrated in FIG. 6D. FIG. 6H illustrates an example that the posture of the sensor unit 2 is changed about the roll axis AR from the state illustrated in FIG. 6E. FIG. 6I illustrates an example that the posture of the sensor unit 2 is changed about the yaw axis AY from the state illustrated in FIG. 6F.

Figure 7A:
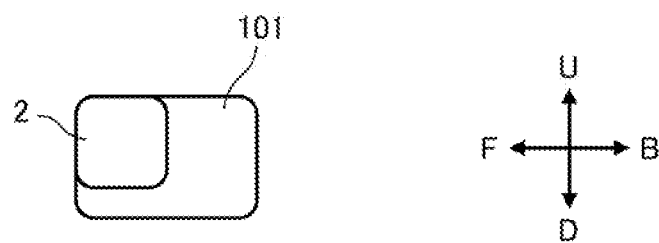
FIG. 7A illustrates another exemplary operation of the sensor unit of FIG. 1.
Figure 7B:
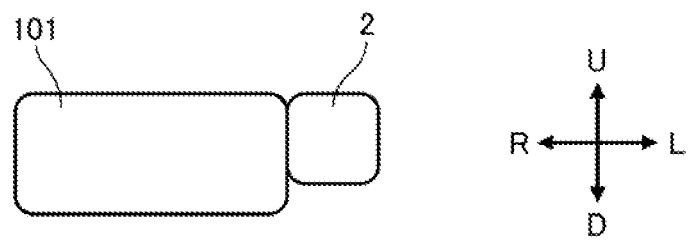
FIG. 7B illustrates another exemplary operation of the sensor unit of FIG. 1.
Figure 7C:
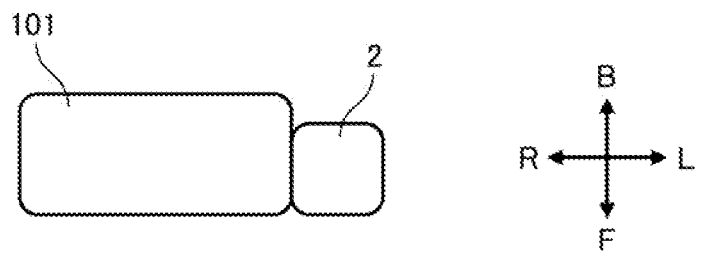
FIG. 7C illustrates another exemplary operation of the sensor unit of FIG. 1.
Figure 7D:
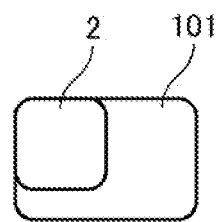
FIG. 7D illustrates another exemplary operation of the sensor unit of FIG. 1.
Figure 7D:
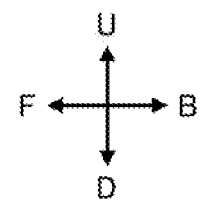
Figure 7E:
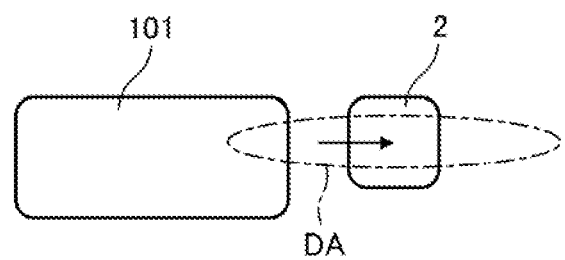
FIG. 7E illustrates another exemplary operation of the sensor unit of FIG. 1.
Figure 7E:
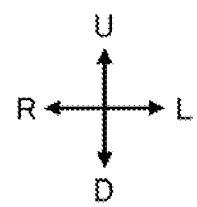
Figure 7F:
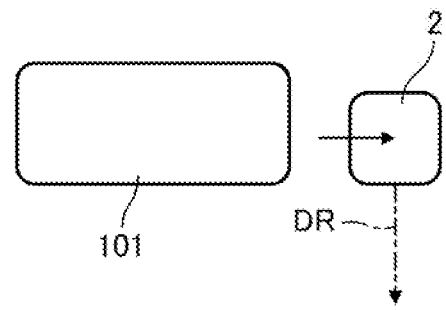
FIG. 7F illustrates another exemplary operation of the sensor unit of FIG. 1.
Figure 7F:
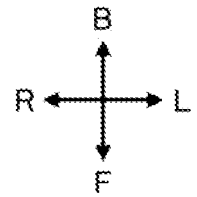

FIGS. 7A to 7C schematically illustrate an initial positional relationship between the sensor unit 2 and the lamp housing 101 disposed in the front portion of the vehicle 100. FIGS. 7D to 7F illustrate a state that the sensor unit 2 is translated leftward along the pitch axis AP.

Figure 7G:
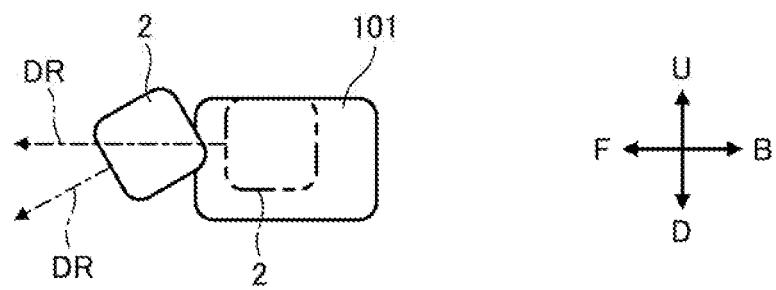
FIG. 7G illustrates another exemplary operation of the sensor unit of FIG. 1.
Figure 7H:
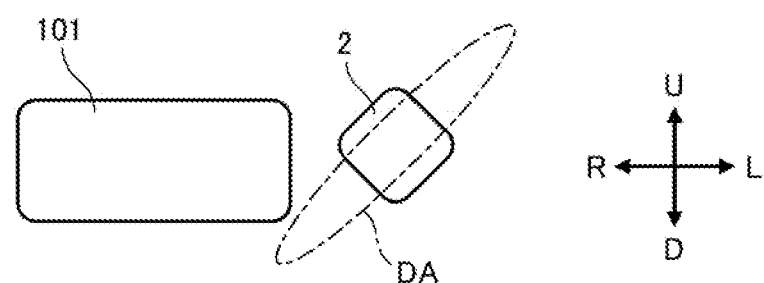
FIG. 7H illustrates another exemplary operation of the sensor unit of FIG. 1.
Figure 7I:
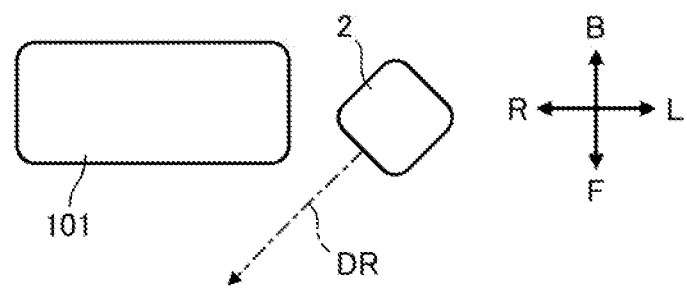
FIG. 7I illustrates another exemplary operation of the sensor unit of FIG. 1.

FIG. 7G illustrates an example that the posture of the sensor unit 2 is changed about the pitch axis AP from the state illustrated in FIG. 7D. FIG. 7H illustrates an example that the posture of the sensor unit 2 is changed about the roll axis AR from the state illustrated in FIG. 7E. FIG. 7I illustrates an example that the posture of the sensor unit 2 is changed about the yaw axis AY from the state illustrated in FIG. 7F.

By appropriately combining at least one of the translation along the yaw axis AY, the translation along the pitch axis AP, and the translation along the roll axis AR with at least one of the turning about the yaw axis AY, the turning about the pitch axis AP, and the turning about the roll axis AR, it would be possible to cause the sensor unit 2 to take a posture that cannot be assumed in the initial state. Accordingly, the range and the degree of freedom in connection with the location change of the sensing area DA can be further increased.

Figure 8:
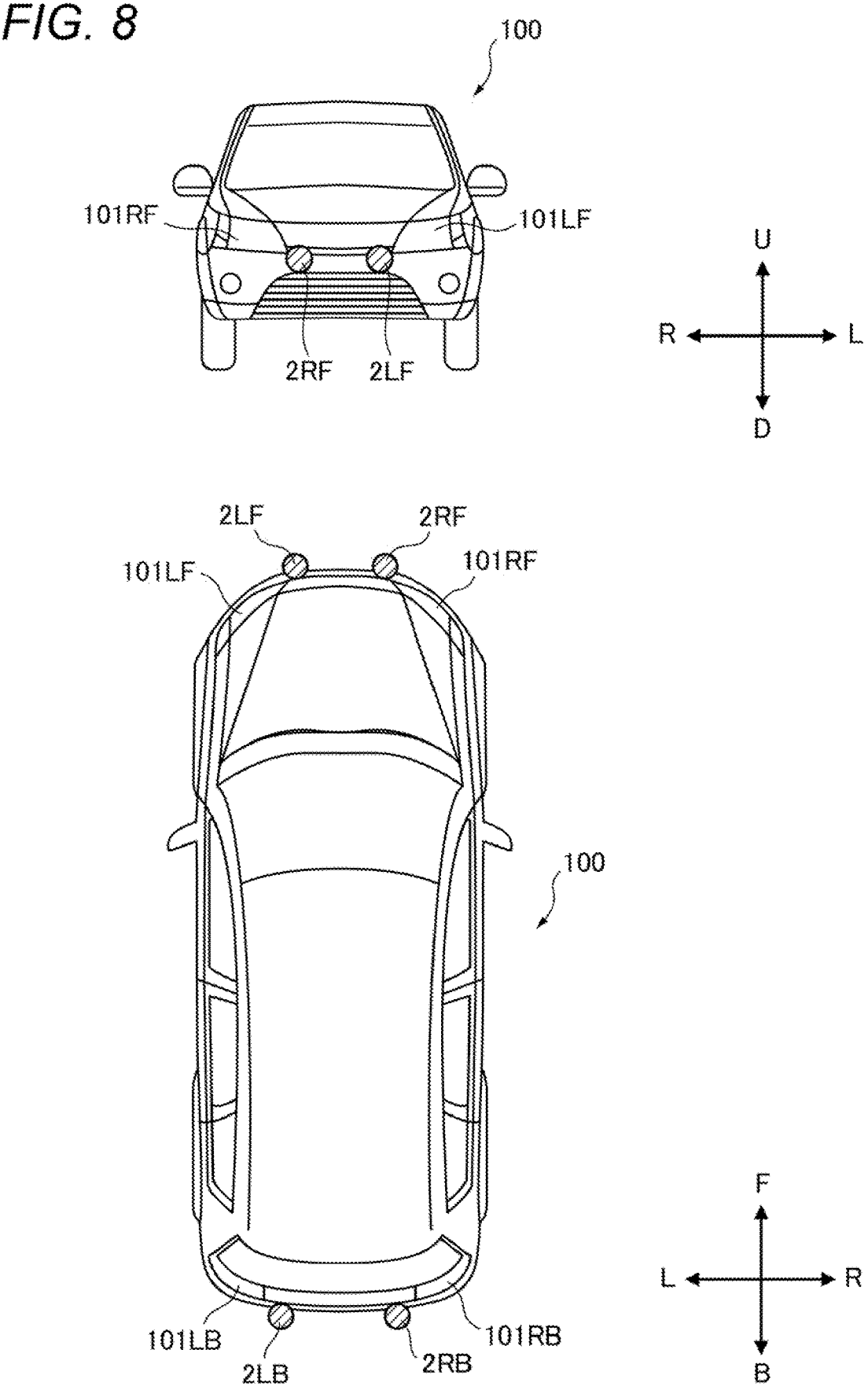
FIG. 8 illustrates another exemplary arrangement of a sensor unit of FIG. 1.

As illustrated in FIG. 8, the sensor system 1 may include a left front sensor unit 2LF and a right front sensor unit 2RF As for the configuration of each sensor unit, the descriptions relating to the sensor unit 2 described above can be applied.

In this case, although not illustrated, the actuator 3 includes an actuator for changing at least one of the posture and the position of the left front sensor unit 2LF, as well as an actuator for changing at least one of the posture and the position of the right front sensor unit 2RF. As for the processor 4, a device for controlling the actuator associated with the left front sensor unit 2LF and a device for controlling the actuator associated with the right front sensor unit 2RF may be individually provided, or both actuators may be controlled by a common device.

The left front sensor unit 2LF is disposed on the right of a left front lamp housing 101LF. The right front sensor unit 2RF is disposed on the left of a right front lamp housing 101RF. The left front lamp housing 101LF is an example of a left lamp housing. The right front lamp housing 101RF is an example of a right lamp housing. The left front sensor unit 2LF is an example of a first sensor unit. The right front sensor unit 2RF is an example of a second sensor unit.

Figure 9A:
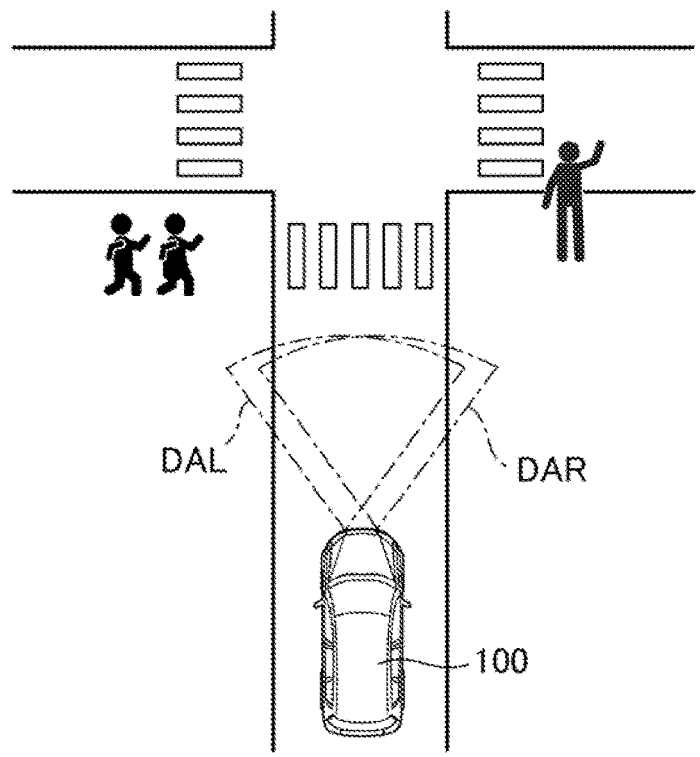
FIG. 9A illustrates an exemplary operation of the sensor unit of FIG. 8.
Figure 9B:
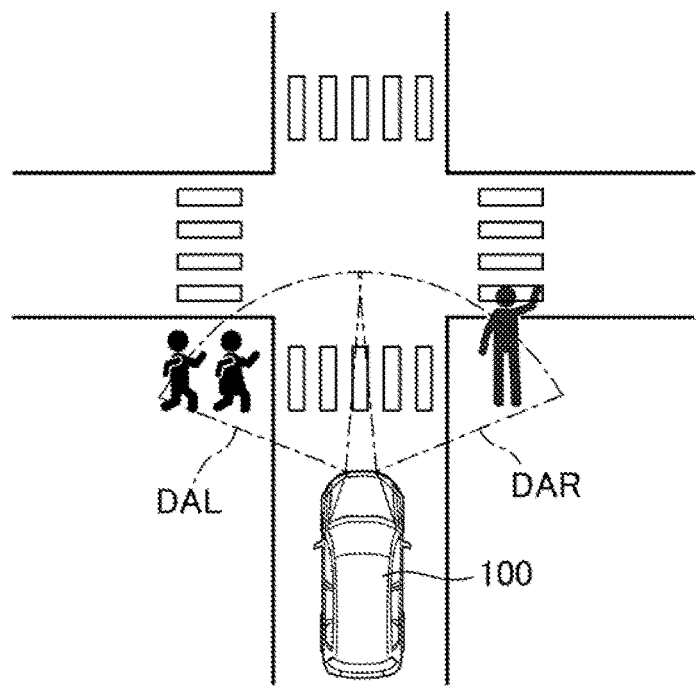
FIG. 9B illustrates an exemplary operation of the sensor unit of FIG. 8.

An example of the operation of the sensor system 1 configured as described above will be described with reference to FIGS. 9A and 9B. FIG. 9A illustrates a vehicle 100 traveling toward an intersection. FIG. 9B illustrates the vehicle 100 in a state closer to the intersection.

In the state illustrated in FIG. 9B, the actuator 3 causes the left front sensor unit 2LF to turn in the counterclockwise direction in the drawing about the yaw axis AY based on the control signal SC from the processor 4. At least one of the translation along the yaw axis AY, the translation along the pitch axis AP, and the translation along the roll axis AR described with reference to FIGS. 5A to 7I may be combined. As a result, the location of a left front sensing area DAL with respect to the left front lamp housing 101LF is changed from the initial state. The left front sensing area DAL is an area capable of detecting information in the outside area of the vehicle 100 with the left front sensor unit 2LF.

Similarly, based on the control signal SC from the processor 4, the actuator 3 causes the right front sensor unit 2RF to turn in the clockwise direction in the drawing about the yaw axis AY. At least one of the translation along the yaw axis AY, the translation along the pitch axis AP, and the translation along the roll axis AR described with reference to FIGS. 5A to 7I may be combined. As a result, the location of a right front sensing area DAR with respect to the right front lamp housing 101RF is changed from the initial state. The right front sensing area DAR is an area capable of detecting information in the outside area of the vehicle 100 with the right front sensor unit 2RF.

As a result, the area capable of detecting information in the outside area of the vehicle 100 with any one of the left front sensor unit 2LF and the right front sensor unit 2RF is expanded from the initial state illustrated in FIG. 9A. In this example, the sensing area is expanded so as to include not only roads in the vicinity of the intersection but also sidewalks.

Since each sensor unit is disposed outside the lamp housing, and at least one of the posture and the position thereof is changed by the actuator 3, it is possible to realize appropriate changing control of the location of the sensing area according to the situation including the above example with high degree of freedom.

Figure 10:
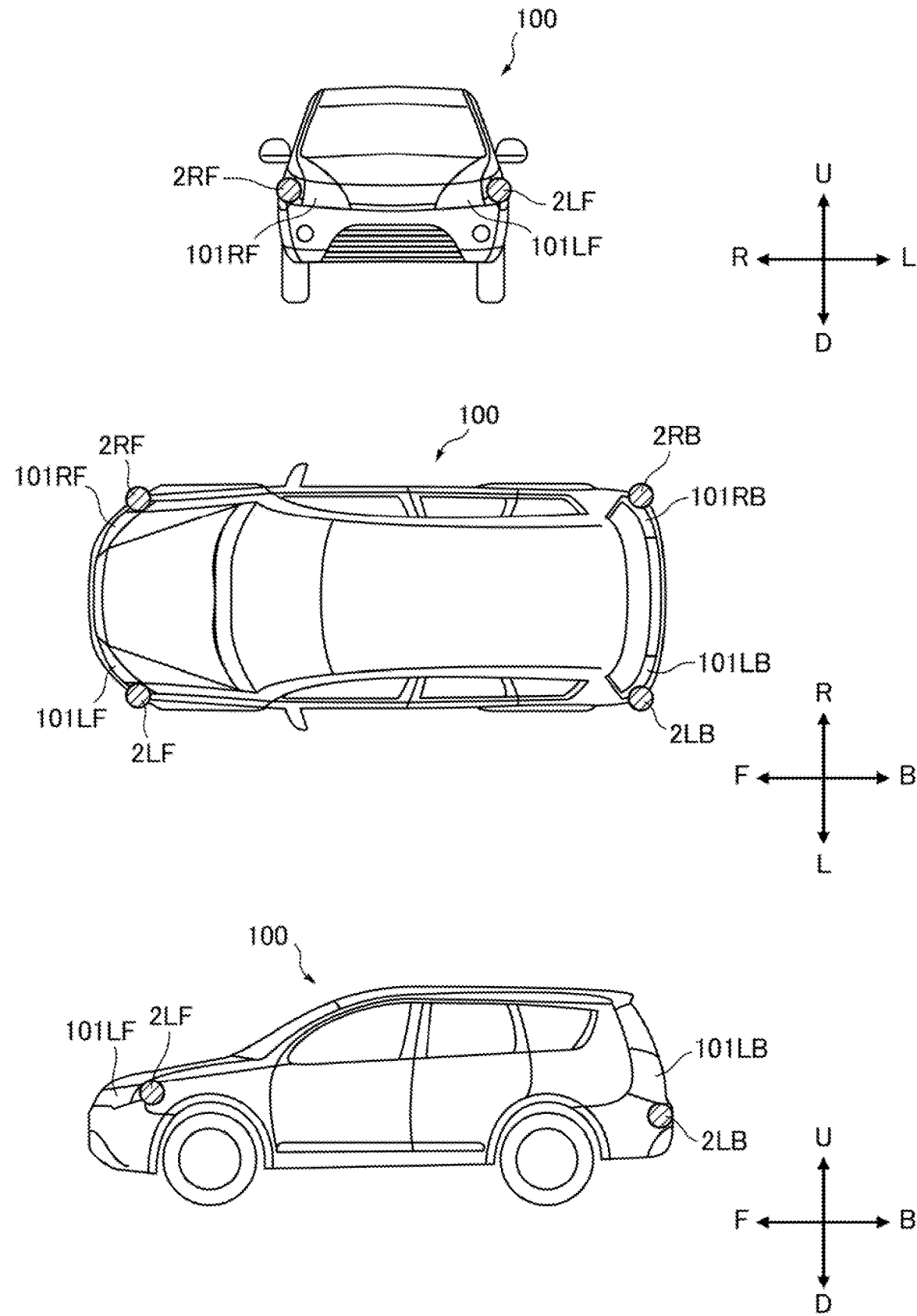
FIG. 10 illustrates another exemplary arrangement of a sensor unit of FIG. 1.

The operation described with reference to FIGS. 9A and 9B can also be realized by the arrangement of the left front sensor unit 2LF and the right front sensor unit 2RF illustrated in FIG. 10.

The left front sensor unit 2LF is disposed on the left of the left front lamp housing 101LF. The right front sensor unit 2RF is disposed on the right of the right front lamp housing 101RF. The left front lamp housing 101LF is an example of the left lamp housing. The right front lamp housing 101RF is an example of the right lamp housing. The left front sensor unit 2LF is an example of the first sensor unit. The right front sensor unit 2RF is an example of the second sensor unit.

As used herein, the term "left lamp housing" means a lamp housing which is located on the left of the right lamp housing when viewed from the vehicle cabin. As used herein, the term "right lamp housing" means a lamp housing located on the right of the left lamp housing when viewed from the vehicle cabin.

Accordingly, in the relationship between the left front lamp housing 101LF and the left rear lamp housing 101LB, the left rear lamp housing 101LB is an example of the left lamp housing, and the left front lamp housing 101LF is an example of the right lamp housing. As illustrated in FIG. 8 and FIG. 10, the sensor unit 2 may include a left rear sensor unit 2LB. In this case, the left rear sensor unit 2LB is an example of the first sensor unit, and the left front sensor unit 2LF is an example of the second sensor unit. Depending on the situation in the outside area of the vehicle 100, the location of each sensing area can be changed based on the cooperation between the two sensor units.

Similarly, in the relationship between the left rear lamp housing 101LB and the right rear lamp housing 101RB, the right rear lamp housing 101RB is an example of the left lamp housing, and the left rear lamp housing 101LB is an example of the right lamp housing. As illustrated in FIG. 8 and FIG. 10, the sensor unit 2 may include a right rear sensor unit 2RB. In this case, the right rear sensor unit 2RB is an example of the first sensor unit, and the left rear sensor unit 2LB is an example of the second sensor unit. Depending on the situation in the outside area of the vehicle 100, the location of each sensing area can be changed based on the cooperation between the two sensor units.

Similarly, in the relationship between the right rear lamp housing 101RB and the right front lamp housing 101RF, the right front lamp housing 101RF is an example of the left lamp housing, and the right rear lamp housing 101RB is an example of the right lamp housing. In this case, the right front sensor unit 2RF is an example of the first sensor unit, and the left rear sensor unit 2LB is an example of the second sensor unit. Depending on the situation in the outside area of the vehicle 100, the location of each sensing area can be changed based on the cooperation between the two sensor units.

Figure 11:
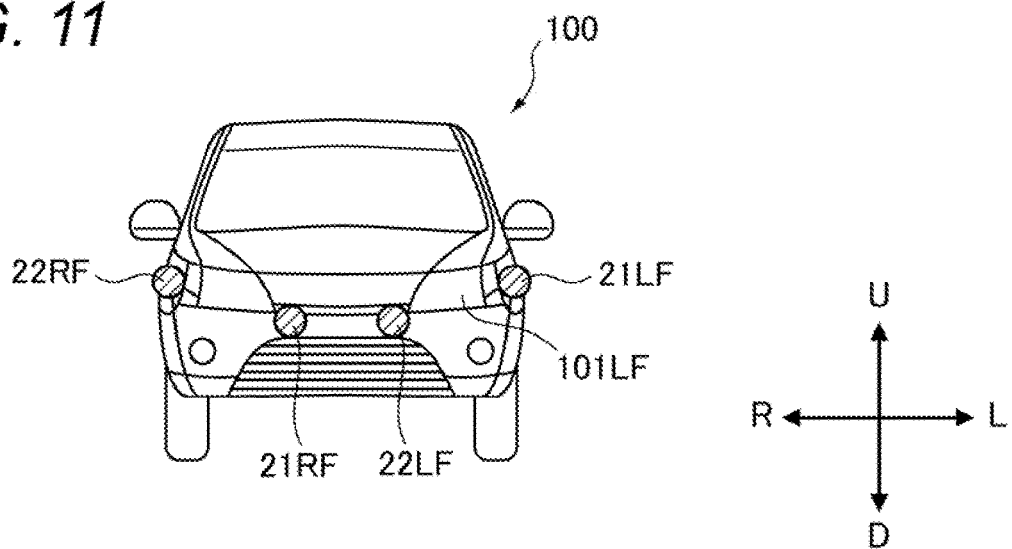
FIG. 11 illustrates another exemplary arrangement of a sensor unit of FIG. 1.
Figure 11:
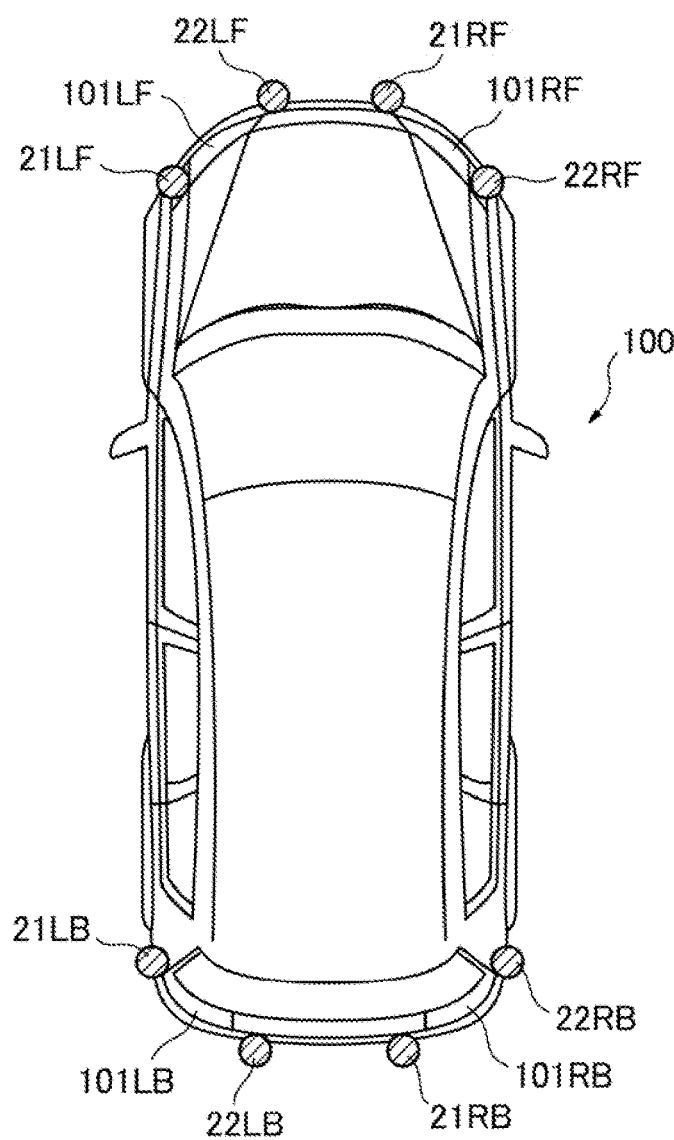

As illustrated in FIG. 11, the sensor system 1 may include a first left front sensor unit 21LF and a second left front sensor unit 22LF. As for the configuration of each sensor unit, the descriptions relating to the sensor unit 2 described above can be applied.

In this case, although not illustrated, the actuator 3 includes an actuator for changing at least one of the posture and the position of the first left front sensor unit 21LF, and an actuator for changing at least one of the posture and the position of the second left front sensor unit 22LF. As for the processor 4, a device for controlling the actuator associated with the first left front sensor unit 21LF and a device for controlling the actuator associated with the second left front sensor unit 22LF may be individually provided, or both actuators may be controlled by a common device.

The first left front sensor unit 21LF is disposed on the left of the left front lamp housing 101LF. The second left front sensor unit 22LF is disposed on the right of the left front lamp housing 101LF. The first left front sensor unit 21LF is an example of the first sensor unit. The second left front sensor unit 22LF is an example of the second sensor unit.

Figure 12A:
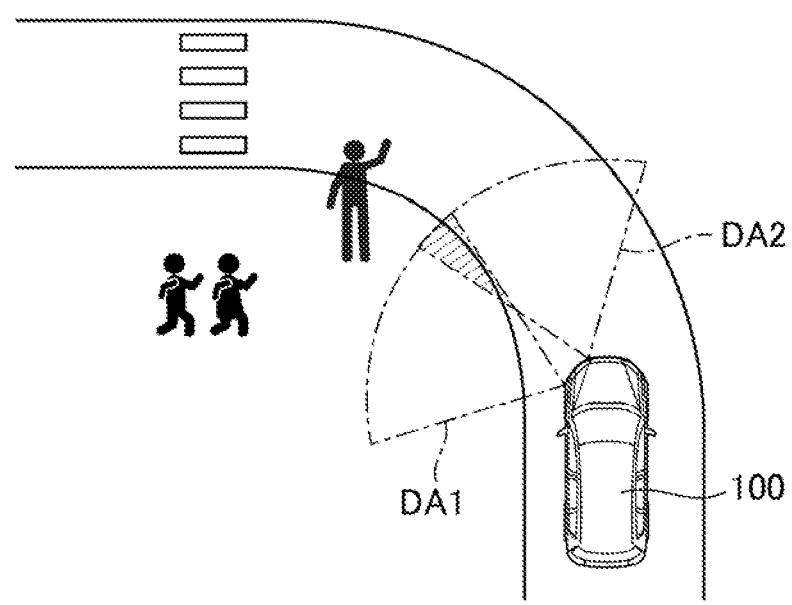
FIG. 12A illustrates an exemplary operation of the sensor unit of FIG. 11.
Figure 12B:
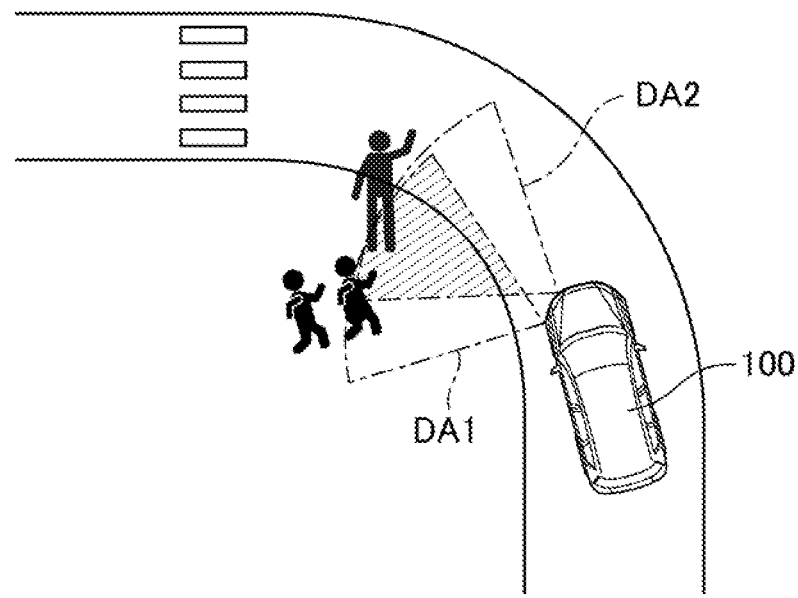
FIG. 12B illustrates an exemplary operation of the sensor unit of FIG. 11.

An example of the operation of the sensor system 1 configured as described above will be described with reference to FIGS. 12A and 12B. FIG. 12A illustrates a vehicle 100 traveling toward a road curved to the left. FIG. 12B illustrates the vehicle 100 in a state closer to the curved road.

In the state illustrated in FIG. 12B, the actuator 3 causes the first left front sensor unit 21LF to turn in the clockwise direction in the drawing about the yaw axis AY based on the control signal SC from the processor 4. At least one of the translation along the yaw axis AY, the translation along the pitch axis AP, and the translation along the roll axis AR described with reference to FIGS. 5A to 7I may be combined. As a result, the location of a first sensing area DA1 with respect to the left front lamp housing 101LF is changed from the initial state. The first sensing area DA1 is an area capable of detecting information in the outside area of the vehicle 100 with the first left front sensor unit 21LF.

Similarly, based on the control signal SC from the processor 4, the actuator 3 causes the second left front sensor unit 22LF to turn in the counterclockwise direction in the drawing about the yaw axis AY. At least one of the translation along the yaw axis AY, the translation along the pitch axis AP, and the translation along the roll axis AR described with reference to FIGS. 5A to 7I may be combined. As a result, the location of a second sensing area DA2 with respect to the left front lamp housing 101LF is changed from the initial state. The second sensing area DA2 is an area capable of detecting information in the outside area of the vehicle 100 with the second left front sensor unit 22LF.

As a result, the position of the area capable of detecting information in the outside area of the vehicle 100 with both the first left front sensor unit 21LF and the second left front sensor unit 22LF with respect to the left front lamp housing 101LF is changed from the initial state illustrated in FIG. 12A. The area where the sensing areas of both sensor units overlap is an area where the sensing resolution is made relatively higher. In this example, the area having a higher sensing resolution is disposed on a walkway around the curved road while a size thereof is expanded.

Since each sensor unit is disposed outside the lamp housing, and at least one of the posture and the position thereof is changed by the actuator 3, it is possible to realize appropriate changing control of the resolution of the sensing area according to the situation including the above example with high degree of freedom. At least one of the location and the size of the area having a higher sensing resolution can be changed according to the situation in the outside area of the vehicle 100.

As illustrated in FIG. 11, the sensor unit 2 may include a first right front sensor unit 21RF and a second right front sensor unit 22RF. The first right front sensor unit 21RF is disposed on the left of the right front lamp housing 101RF. The second right front sensor unit 22RF is disposed on the right of the right front lamp housing 101RF. The first right front sensor unit 21RF is an example of the first sensor unit. The second right front sensor unit 22RF is an example of the second sensor unit. Similar to the example of the first left front sensor unit 21LF and the second left front sensor unit 22LF described with reference to FIGS. 12A and 12B, the locations of the respective sensing areas can be changed according to the situation in the outside area of the vehicle 100 based on the cooperation between the first right front sensor unit 21RF and the second right front sensor unit 22RF.

As illustrated in FIG. 11, the sensor unit 2 may include a first left rear sensor unit 21LB and a second left rear sensor unit 22LB. The first left rear sensor unit 21LB is disposed on the left of the left rear lamp housing 101LB. The second left rear sensor unit 22LB is disposed on the right of the left rear lamp housing 101LB. The first left rear sensor unit 21LB is an example of the first sensor unit. The second left rear sensor unit 22LB is an example of the second sensor unit. Similar to the example of the first left front sensor unit 21LF and the second left front sensor unit 22LF described with reference to FIGS. 12A and 12B, the locations of the respective sensing areas can be changed according to the situation in the outside area of the vehicle 100 based on the cooperation between the first left rear sensor unit 21LB and the second left rear sensor unit 22LB.

As illustrated in FIG. 11, the sensor unit 2 may include a first right rear sensor unit 21RB and a second right rear sensor unit 22RB. The first right rear sensor unit 21RB is disposed on the left of the right rear lamp housing 101RB. The second right rear sensor unit 22RB is disposed on the right of the right rear lamp housing 101RB. The first right rear sensor unit 21RB is an example of the first sensor unit. The second right rear sensor unit 22RB is an example of the second sensor unit. Similar to the example of the first left front sensor unit 21LF and the second left front sensor unit 22LF described with reference to FIGS. 12A and 12B, the locations of the respective sensing areas can be changed according to the situation in the outside area of the vehicle 100 based on the cooperation between the first right rear sensor unit 21RB and the second right rear sensor unit 22RB.

The above embodiments are mere examples for facilitating understanding of the presently disclosed subject matter. The configuration according to the above embodiments can be appropriately modified or improved without departing from the gist of the presently disclosed subject matter.

In the above embodiment, the change of the position of the sensor unit 2 is realized by at least one of translation along the yaw axis AY, translation along the pitch axis AP, and translation along the roll axis AR. However, the direction of the translational movement of the sensor unit 2 may not be along these axes. The position of the sensor unit 2 may be changed without translation.

The present application is based on Japanese Patent Application No. 2018-220991 filed on Nov. 27, 2018, the entire contents of which are incorporated herein by reference.

The invention claimed is:

1. A sensor system adapted to be installed in a vehicle, comprising:
   a sensor unit adapted to be disposed outside a lamp housing of the vehicle to detect information in an outside area of the vehicle;
   an actuator configured to be able to change a position of the sensor unit with respect to the lamp housing; and
   a processor configured to control an operation of the actuator.

2. The sensor system according to claim 1,
   wherein the actuator translates the sensor unit to change the position thereof.

3. The sensor system according to claim 1,
   wherein the lamp housing includes a left lamp housing and a right lamp housing; and
   wherein the sensor unit includes: a first sensor unit adapted to be disposed on the right of the left lamp housing; and a second sensor unit adapted to be disposed on the left of the right lamp housing.

4. The sensor system according to claim 3
   wherein the processor is configured to control the operation of the actuator so as to expand an area capable of detecting the information with any one of the first sensor unit and the second sensor unit.

5. The sensor system according to claim 3,
   wherein the processor is configured to control the operation of the actuator so as to change at least one of a location and a size of an area capable of detecting the information with both of the first sensor unit and the second sensor unit.

6. The sensor system according to claim 1,
   wherein the lamp housing includes a left lamp housing and a right lamp housing; and
   wherein the sensor unit includes: a first sensor unit adapted to be disposed on the left of the left lamp housing; and a second sensor unit adapted to be disposed on the right of the right lamp housing.

7. The sensor system according to claim 6,
   wherein the processor is configured to control the operation of the actuator so as to expand an area capable of detecting the information with any one of the first sensor unit and the second sensor unit.

8. The sensor system according to claim 6,
   wherein the processor is configured to control the operation of the actuator so as to change at least one of a location and a size of an area capable of detecting the information with both of the first sensor unit and the second sensor unit.

9. The sensor system according to claim 1,
   wherein the sensor unit includes: a first sensor unit adapted to be disposed on the left of the lamp housing; and a second sensor unit adapted to be disposed on the right of the lamp housing.

10. The sensor system according to claim 9,
    wherein the processor is configured to control the operation of the actuator so as to expand an area capable of detecting the information with any one of the first sensor unit and the second sensor unit.

11. The sensor system according to claim 9,
    wherein the processor is configured to control the operation of the actuator so as to change at least one of a location and a size of an area capable of detecting the information with both of the first sensor unit and the second sensor unit.

12. The sensor system according to claim 1,
    wherein the actuator is further configured to be able to change a posture of the sensor unit with respect to the lamp housing.

13. The sensor system according to claim 12,
    wherein the changing of the position or the posture of the sensor unit with respect to the lamp housing comprises at least one of translating or turning the sensor unit about at least one of a yaw axis, a pitch axis, or a roll axis.

14. The sensor system according to claim 13,
    wherein, in a state in which the sensor is translated about the yaw axis, the information detected in the outside area of the vehicle translates in an up-down direction of the vehicle, and
    wherein in a state in which the sensor is translated about the pitch axis, the information detected in the outside area of the vehicle translates in an left-right direction of the vehicle.

* * * * *